United States Patent [19]
Wahlstrom

[11] Patent Number: 5,983,752
[45] Date of Patent: Nov. 16, 1999

[54] ADJUSTABLE COUNTERWEIGHT SYSTEM FOR A MACHINE FOR FORMING CONCRETE BLOCKS, PAVERS OR THE LIKE

[75] Inventor: Daniel R. Wahlstrom, Vancouver, Wash.

[73] Assignee: Columbia Machine, Inc., Vancouver, Wash.

[21] Appl. No.: 08/950,005

[22] Filed: Oct. 14, 1997

[51] Int. Cl.[6] ...................................................... F16C 3/04
[52] U.S. Cl. .............................. 74/603; 74/604; 74/573 R
[58] Field of Search ....................... 74/603, 604, 572–574

[56] References Cited

U.S. PATENT DOCUMENTS

| | | | |
|---|---|---|---|
| 2,307,518 | 1/1943 | Larsen | 74/604 |
| 2,364,109 | 12/1944 | Taylor | 74/604 |
| 2,434,659 | 1/1948 | Kluppel | 74/595 |
| 4,611,503 | 9/1986 | Kocher | 74/603 |
| 5,038,727 | 8/1991 | Burns et al. | 74/603 X |
| 5,295,411 | 3/1994 | Speckhart | 74/574 |
| 5,505,610 | 4/1996 | Aaseth et al. | |
| 5,572,939 | 11/1996 | Beatty | 74/603 X |

FOREIGN PATENT DOCUMENTS

| | | | |
|---|---|---|---|
| 60-234148 | 11/1985 | Japan | 74/604 |

*Primary Examiner*—Vinh T. Luong
*Attorney, Agent, or Firm*—Marger Johnson & McCollom, P.C.

[57] ABSTRACT

An adjustable counterweight apparatus for use in vibratory machines, such as concrete molding machines, where a rotating shaft is engaged with a vibrating or oscillating load. The counterweight includes a first bore for receiving a rotating shaft, and a second bore for receiving a plug having a weight selected to dynamically balance the rotating shaft and oscillating load.

17 Claims, 4 Drawing Sheets

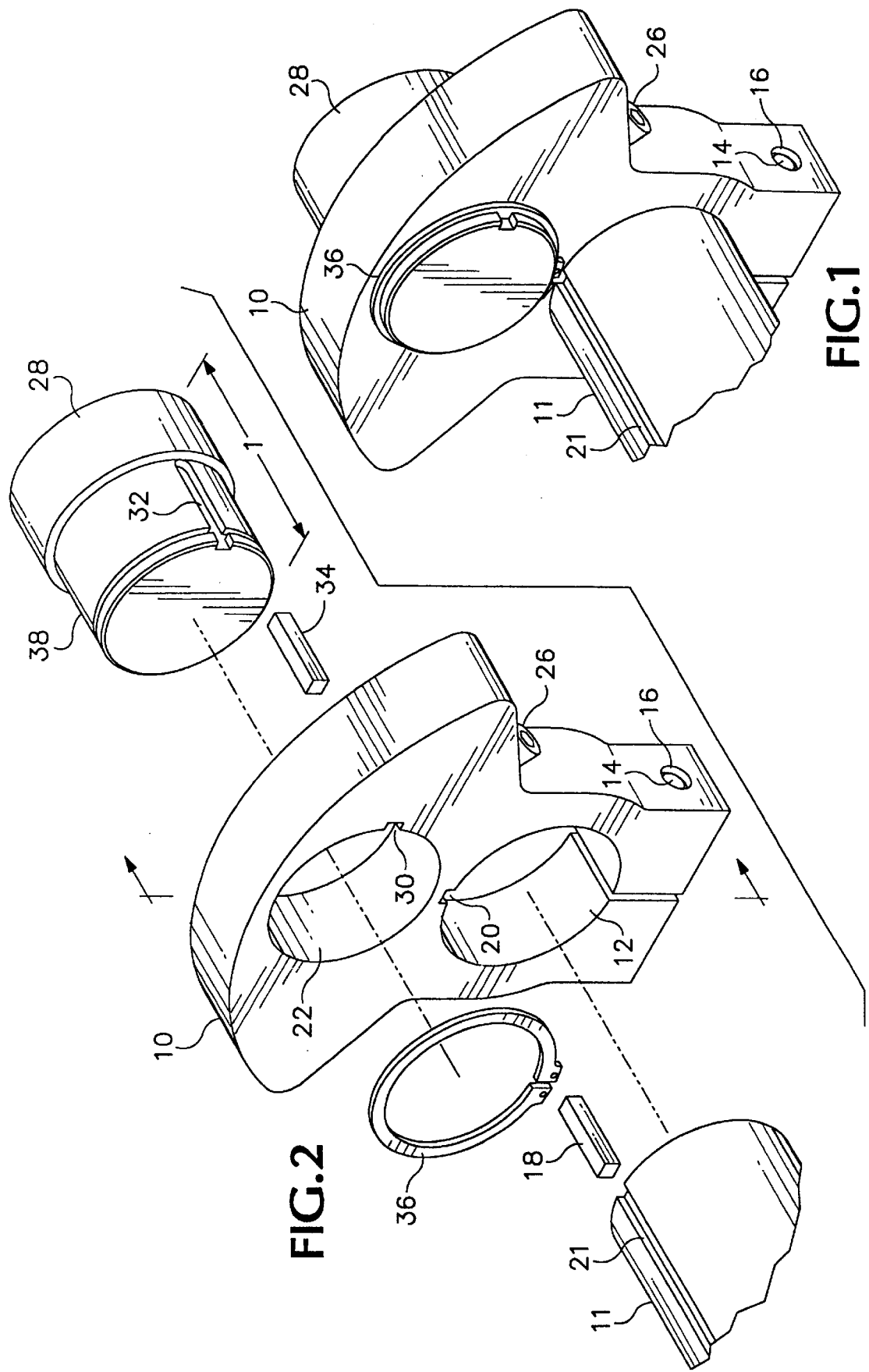

ADJUSTABLE COUNTERWEIGHT SYSTEM FOR A MACHINE FOR FORMING CONCRETE BLOCKS, PAVERS OR THE LIKE

BACKGROUND OF THE INVENTION

1. Field of the Invention

The present invention relates generally to machines for forming concrete products or the like in more particularly to such machines which include a vibration system driven by a drive shaft.

2. Description of the Related Art

U.S. Pat. No. 5,505,610 to Aaseth et al. discloses apparatus for forming concrete products and is incorporated herein by reference. FIGS. 4 and 5 of Aaseth et al. depict counterweights 113, 121 which are used to dampen vibrations. The amplitude of the vibrations vary upon the size of the mold box installed in the machine. It would be desirable to vary the weight and/or of center of gravity of the counterweights depending upon the size of the mold box installed in "a concrete products forming machine".

SUMMARY OF THE INVENTION

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is a perspective view of a counterweight constructed in accordance with the present invention.

FIG. 2 is an exploded perspective view of the counterweight of FIG. 1.

DETAILED DESCRIPTION OF THE PREFERRED EMBODIMENTS

Figure 4:
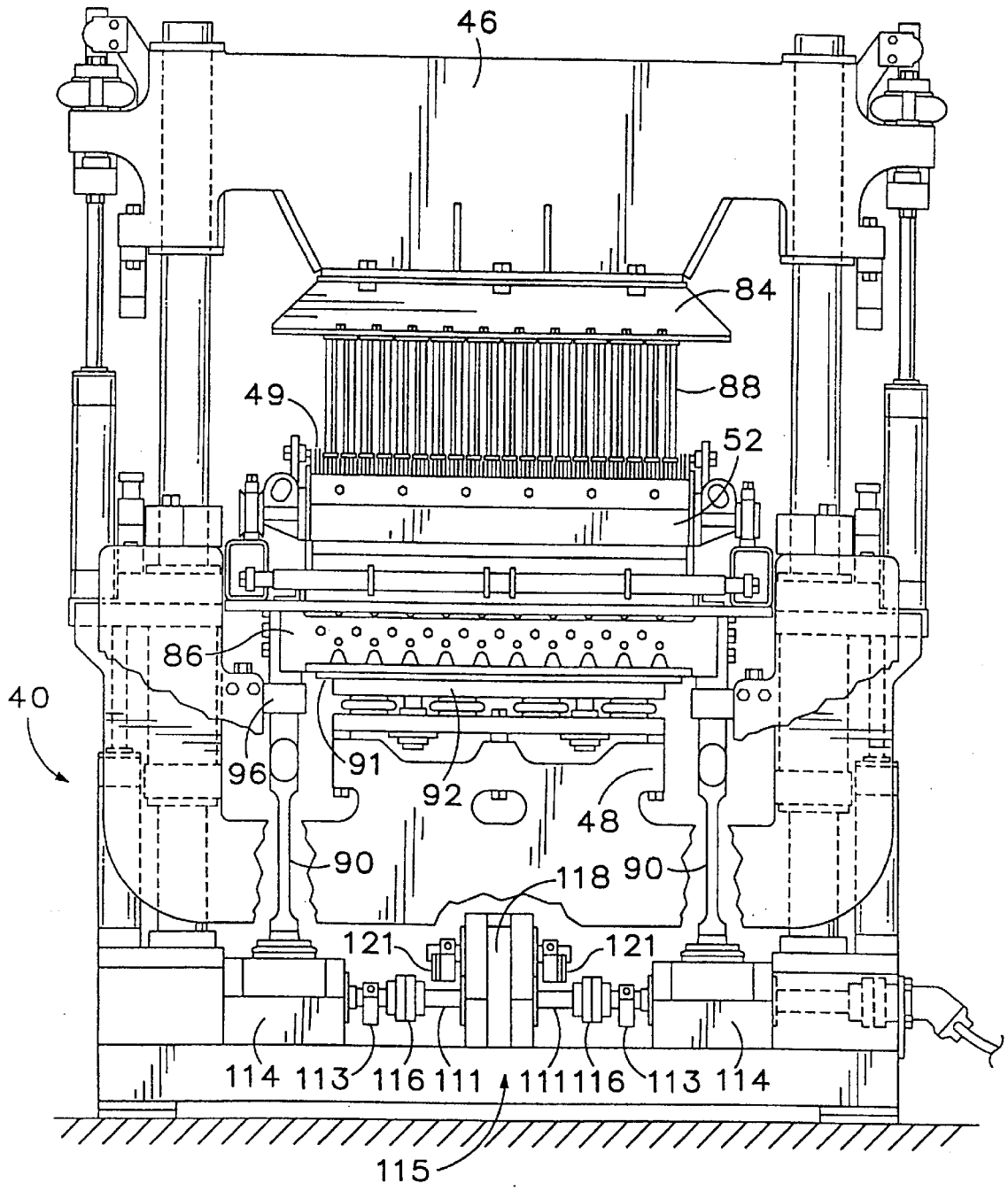
FIGS. 4 and 5 show prior art device.

FIG. 4 is a front elevation view, partially broken away, showing in detail a prior art vibration system 115 of a products forming machine 40 disclosed in U.S. Pat. No. 5,505,610, owned in common by the assignee of the present invention and incorporated herein by reference. The compression beam 46 and stripper beam 48 are shown in fully raised positions. In the raised position, head assembly 84 is lifted sufficiently upward so that feed drawer 52, used for dispensing concrete material into cavities of the concrete products mold assembly 86, can be moved under shoes 88. Wire brushes 49 are attached to the top of feed drawer 52 and rub the bottom of shoes 88 when moved into the forward position as shown in FIG. 4. In the raised stripper beam position, the table 92 lifts the pallet 91 from the pallet feeder and presses the pallet against the bottom side of the mold assembly 86.

At this early stage in the concrete products forming stage, concrete within mold 86 is typically unevenly distributed thus creating a dynamically unbalanced load. The vibration system 115 is operatively engaged with the products forming machine to shake the mold assembly 86 so that the concrete material is evenly spread within the mold assembly cavities to produce a more homogeneous concrete product.

The prior art vibration system 115 includes a single drive shaft 111 that is connected in various sections. The drive shaft 111 is driven by drive motor 120. The drive shaft 111 actuates two vibrator units 114 each containing a bearing (see FIG. 5) eccentrically attached to drive shaft 111. An associated vibrator rod 90 is joined to the top of a bearing housing. A coupler 116 attaches each vibrator unit 114 to the gear box 118.

The gearbox 118 rotates shaft 122 in a counter-rotating direction in relation to drive shaft 111. Each end of the counter-rotating shaft 122 is shown mounted with a detachable counter-weight 121. Each counter-weight 121 is offset 180 degrees with the eccentrically attached cam inside vibrator unit 114. A second set of counter-weights 113 is bolted to drive shaft 111 close to the inner side of each vibrator unit 114. The vibrator system 115 is shown in detail below in FIGS. 5 and 6.

Figure 5:
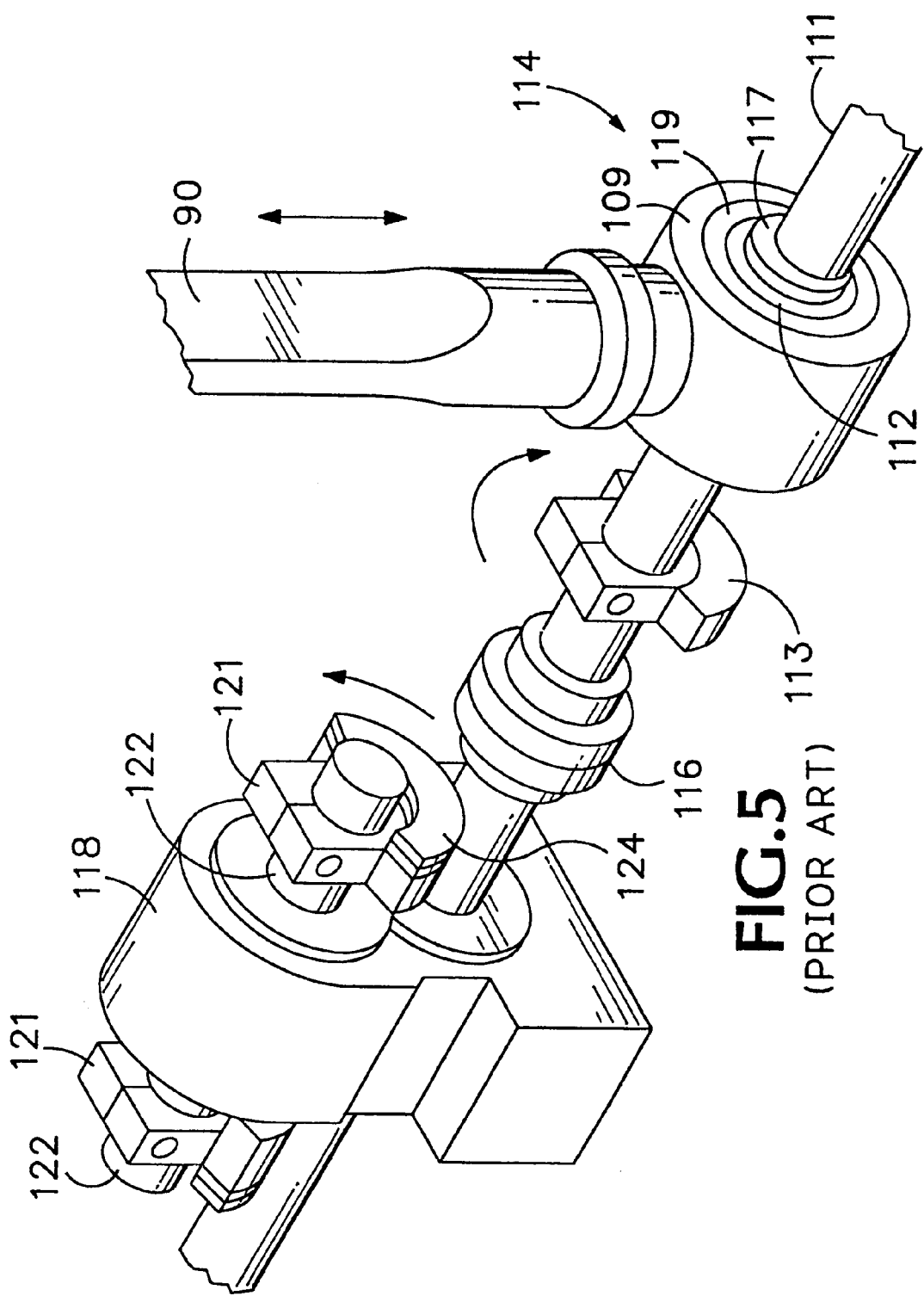

FIG. 5 is an isolated perspective view of the drive means for the prior art vibrator system 115. The vibrator unit 114 is shown with the external casing removed to further illustrate how an eccentrically attached bearing 112 is attached to drive shaft 111. The drive shaft 111 includes a circular flange 117 co-axially joined in the middle of bearing 112. The drive shaft 111 is eccentrically aligned in flange 117. An outside bearing sleeve 119 is rigidly joined via an outside housing 109 to the bottom of vibrator rod 90. The bearing 112 freely rotates inside sleeve 119 about a horizontally aligned axis.

As drive shaft 111 rotates, for example, in a clockwise direction, flange 117 rotates eccentrically around drive shaft 111 in turn eccentrically rotating bearing 112 about drive shaft 111. Bearing 112 eccentrically rotates in sleeve 109 moving vibrating rod 90 up and down. In one embodiment, the center of gravity in counter-weight 113 and the center of gravity in flange 117 are set in the same angular direction in relation to drive shaft 111. The center of gravity in counter-weight 121, however, is offset 180 degrees with that of counter-weight 113 and flange 117.

Counter-weight 121 rotates in a counter-clockwise direction and counter-weight 113 rotates in a clock-wise rotation. Thus, as drive shaft 111 rotates counter-weights 113 and 121 co-act to offset horizontal vibration created while traveling around their respective drive shafts. For example, when the center of gravity of counter-weight 113 and flange 117 are at the 1:00 o'clock position, the center of gravity of counter-weight 121 is at the 11:00 o'clock position. Accordingly, as counter-weight 113 and flange 117 rotate into an 8:00 o'clock position, counter-weight 121 is in the 4:00 o'clock position. Thus, the counter-weights co-act to offset their horizontally exerted forces.

Due to the 180 degree offset between count-weight 121 and counter-weight 113 the center of gravity of each counter-weight and flange 117 moves vertically upward and vertically downward at the same time. Thus, the vertical force of counter-weights 113 and 121 and flange 117 are additive when creating vertical vibration. Additional plates 124 can be attached to the sides of counter-weight 121 to fine tune vibration effects in the product-forming machine. Alternative counter-weight configurations are also possible, for example, counter-weights 113 can be attached on each side of casing 109 to further negate horizontal vibration.

The counterweights 10 of the present invention are intended to replace the counterweights 113, 121 of the prior art vibration system 115.

Figure 3:
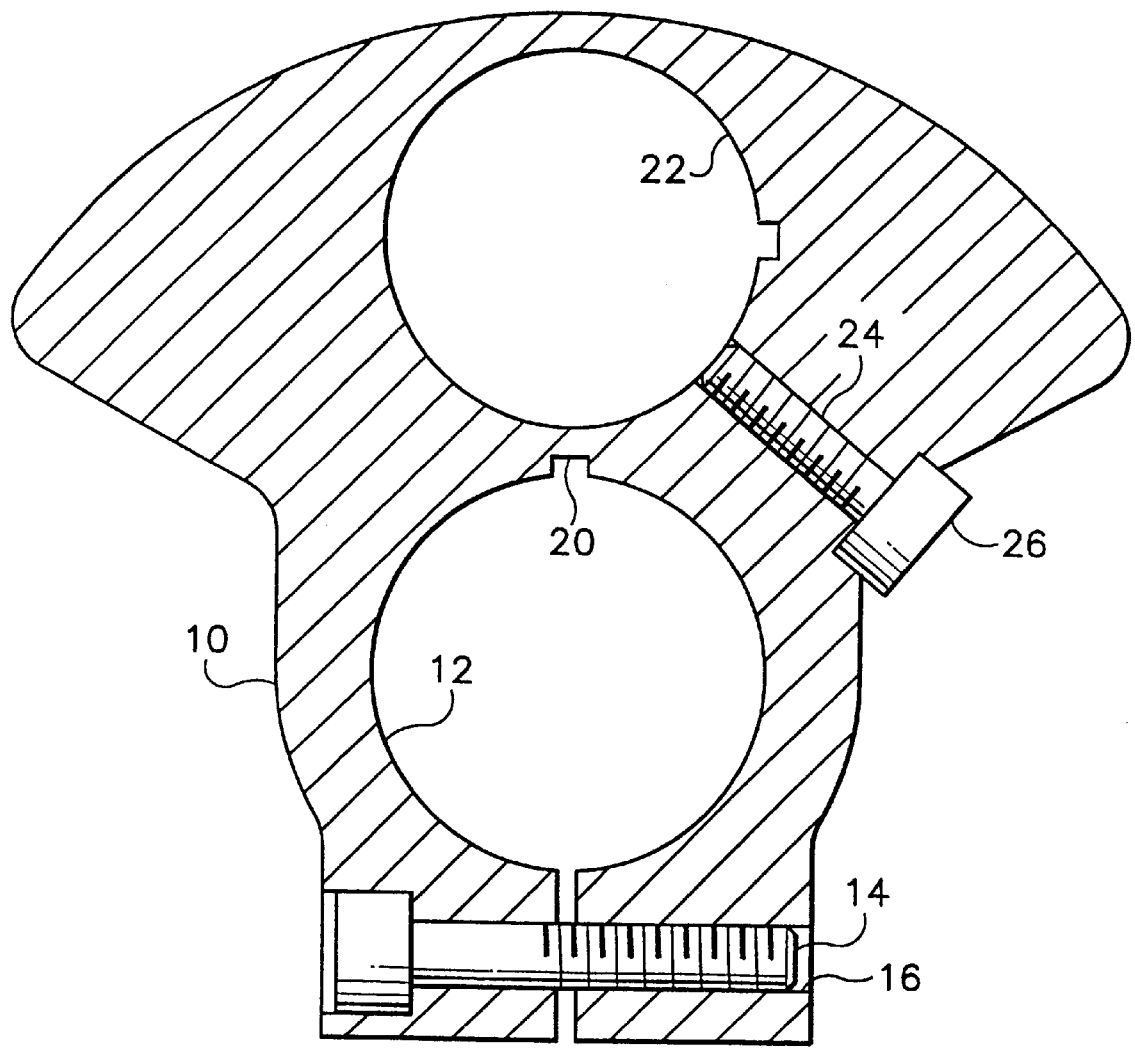
FIG. 3 is a side cross-sectional view of the counterweight shown in FIG. 1.

Referring to FIGS. 1–3, the counterweight 10 is machined from steel and includes a bore 12 in which the drive shaft 11 of the vibration system is inserted. A bolt 14 is inserted in a bore 16 to clamp the counterweight 10 to the shaft 11 in alignment with a key 18 received in the bore keyway 20 and corresponding shaft keyway 2 as shown in the drawings. A plug bore 22 communicates with a threaded bore 24, in which is threaded bolt 26. Also provided is a removable plug 28. Plug bore 22 and plug 28 have corresponding keyways 30 and 32 into which is fitted a key 34 to prevent the plug from rotating within the bore. To axially secure plug 28 in bore 22, snap ring 36 is fitted into a corresponding channel 38. If deemed necessary, plug 28 can be additionally secured in bore 22 by bolt 26. Applicant has found, however, that bore 22 and bolt 26 are not necessary for satisfactory operation, and are not incorporated in the preferred embodiment. Plug 28 is sized in the dimension "1" in FIG. 2 to have a predetermined weight as more fully explained below. As also explained below, interchangeable plugs 28, each having a different weight, are provided as a means of balancing differing loads.

In operation, shaft 11 is engaged at one end with a load to be vibrated or oscillated. In the preferred embodiment, the load is a mold filled with green concrete which is to be compacted by rapid oscillation. The oscillatory motion for compacting the green concrete is provided by a rotating shaft. It will be appreciated by those skilled in the art, however, that the invention is not limited to concrete molding machines, and will have applications in other instances to achieve dynamic balancing of changeable oscillating loads. A plug 28 of the appropriate weight is selected, depending on the size of the mold being used, and plug 28 is secured in bore 22. The counterweight 10 is mounted on and secured to the shaft 11 as previously described and shown in FIG. 1. The shaft is then rotated to oscillate the concrete mold, or other load, with the oscillating load, the shaft, and the counterweight dynamically balanced. The invention provides a significant improvement in the operation of concrete product molding machines, for example, which can now be conveniently configured to be dynamically balanced when used to form products of different sizes and weights, for example, when using any of small, medium-and large molds used on the concrete product machine.

In addition, by providing a counterweight system which can be tailored to dynamically balance different sized molds, or other loads, wear and tear on the molding machine is reduced, and less vibration is transmitted to the underlying floors. A further advantage of the invention is that the claimed adjustable counterweight can be used in place of existing counterweights without modification of the molding machinery.

It will be appreciated by those skilled in the art that the foregoing embodiments could be changed in detail and materials, for example, without departing from the spirit and scope of the following claims.

I claim:

1. A counterweight apparatus comprising:
   a rotatable shaft operatively engaged with a dynamically unbalanced load;
   an adjustable counterweight interlockingly engaged with the rotatable shaft and having surfaces defining a first bore;
   a weighted member removably mounted in the first bore, the weighted member having a mass selected to dynamically balance the dynamically unbalanced load; wherein the rotatable shaft is mounted in a concrete product molding machine, and wherein the dynamically unbalanced load comprises an oscillating concrete product mold.

2. The counterweight apparatus of claim 1 wherein the counterweight includes surfaces defining a second bore, and the rotatable shaft is received in the second bore.

3. The counterweight apparatus of claim 2 which further comprises surfaces defining keyways in the rotatable shaft and in the second bore respectively, and a key engaged in the keyways to prevent the shaft from rotating from within the second bore.

4. The counterweight apparatus of claim 3 further comprising surfaces on said weighted member and said first bore defining a weighted member keyway and a first bore keyway, respectively, and a key engaged in the weighted member keyway and the first bore keyway to prevent the weighted member from rotating from within the first bore.

5. The counterweight apparatus of claim 2 which further comprises surfaces defining keyways in the weighted member and in the first bore respectively, and a key engaged in the keyways to prevent the weighted member from rotating from within the first bore.

6. The counterweight apparatus of claim 1 wherein the counterweight is clampingly mounted on the rotatable shaft.

7. The counterweight apparatus of claim 1 which further comprises the counterweight having a threaded bore communicating with the first bore, and a set screw threaded into the threaded bore and bearing on the weighted member.

8. A counterweight apparatus comprising:
   a rotatable shaft operatively engaged with a dynamically unbalanced load;
   an adjustable counterweight interlockingly engaged with the rotatable shaft and having surfaces defining a first bore having a bore axis that is parallel to a longitudinal axis of said shaft;
   a weighted member removably mounted in the first bore, the weighted member having a mass selected to dynamically balance the dynamically unbalanced load.

9. The counterweight apparatus of claim 8 wherein the counterweight includes surfaces defining a second bore, and the rotatable shaft is received in the second bore.

10. The counterweight apparatus of claim 9 which further comprises surfaces defining keyways in the rotatable shaft and in the second bore respectively, and a key engaged in the keyways to prevent the shaft from rotating from within the second bore.

11. The counterweight apparatus of claim 10 further comprising surfaces on said weighted member and said first bore defining a weighted member keyway and a first bore keyway, respectively, and a key engaged in the weighted member keyway and the first bore keyway to prevent the weighted member from rotating from within the first bore.

12. The counterweight apparatus of claim 9 which further comprises surfaces defining keyways in the weighted member and in the first bore respectively, and a key engaged in the keyways to prevent the weighted member from rotating from within the first bore.

13. The counterweight apparatus of claim 8 wherein the counterweight is clampingly mounted on the rotatable shaft.

14. The counterweight apparatus of claim 8 which further comprises the counterweight having a threaded bore communicating with the first bore, and a set screw threaded into the threaded bore and bearing on the weighted member.

15. The counterweight apparatus of claim 8 wherein the rotatable shaft is mounted in a concrete product molding machine, and wherein the dynamically unbalanced load comprises an oscillating concrete product mold.

16. A counterweight apparatus comprising:

a rotatable shaft operatively engaged with a dynamically unbalanced load;

an adjustable counterweight interlockingly engaged with the rotatable shaft and having surfaces defining a first bore;

a weighted member removably mounted in the first bore, the weighted member having a mass selected to dynamically balance the dynamically unbalanced load; and surfaces defining keyways in the rotatable shaft and in the second bore respectively, and a key engaged in the keyways to prevent the shaft from rotating from within the second bore.

17. A counterweight apparatus comprising:

a rotatable shaft operatively engaged with a dynamically unbalanced load;

an adjustable counterweight interlockingly engaged with the rotatable shaft and having surfaces defining a first bore;

a weighted member removably mounted in the first bore, the weighted member having a mass selected to dynamically balance the dynamically unbalanced load; and surfaces defining keyways in the weighted member and in the first bore respectively, and a key engaged in the keyways to prevent the weighted member from rotating from within the first bore.

\* \* \* \* \*

UNITED STATES PATENT AND TRADEMARK OFFICE
Certificate

Patent No. 5,983,752                                                                                     Patented: November 16, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Daniel R. Wahlstrom, Vancouver, WA; and Kevin Meckel, Lake Oswego, OR.

Signed and Sealed this Second Day of September 2003.

DAVID A. BUCCI
*Supervisory Patent Examiner*
Art Unit 3682